US012272337B2

(12) United States Patent
Engelmann

(10) Patent No.: US 12,272,337 B2
(45) Date of Patent: Apr. 8, 2025

(54) KEYBOARD INSTRUMENT, IN PARTICULAR A PIANO

(71) Applicant: WILHELM SCHIMMEL PIANOFORTE-FABRIK, GESELLSCHAFT MIT BESHRÄNKTER HAFTUNG, Braunschweig (DE)

(72) Inventor: Maximilian Engelmann, Braunschweig (DE)

(73) Assignee: Wilhelm Schimmel Pianofortefabrik, GmbH, Braunschweig (DE)

( * ) Notice: Subject to any disclaimer, the term of this patent is extended or adjusted under 35 U.S.C. 154(b) by 0 days.

(21) Appl. No.: 18/249,782

(22) PCT Filed: Sep. 9, 2021

(86) PCT No.: PCT/EP2021/074832
§ 371 (c)(1),
(2) Date: Jun. 2, 2023

(87) PCT Pub. No.: WO2022/083937
PCT Pub. Date: Apr. 28, 2022

(65) Prior Publication Data
US 2024/0428753 A1 Dec. 26, 2024

(30) Foreign Application Priority Data
Oct. 22, 2020 (DE) ........................ 10 2020 127 845

(51) Int. Cl.
*G10C 1/00* (2006.01)
*G10C 3/12* (2006.01)

(52) U.S. Cl.
CPC ................. *G10C 1/00* (2013.01); *G10C 3/12* (2013.01)

(58) Field of Classification Search
CPC .................................... G10C 1/00; G10C 3/12
See application file for complete search history.

(56) References Cited

U.S. PATENT DOCUMENTS 2,191,443 A 2/1940 Day
3,680,426 A 8/1972 Fry
(Continued)

FOREIGN PATENT DOCUMENTS

DE 4040729 A1 9/1992
DE 4307566 A1 6/1997

OTHER PUBLICATIONS

Leveling Keys, Jun. 9, 2015, viewed at https://www.nolapiano.com/blog/2015/6/9/leveling-keys on Nov. 27, 2024 (Year: 2015).*
(Continued)

*Primary Examiner* — Robert W Horn
(74) *Attorney, Agent, or Firm* — Hinckley Allen & Snyder; Stephen Holmes

(57) ABSTRACT

A keyboard instrument, in particular a piano, has a keyboard (11) with a multiplicity of keys (12) and also at least two supporting elements (21, 22) for supporting the keyboard (11). A panel-form keybed (10) made of a wood material forms a console, and therefore a rest for the keyboard (11). It is Borne by the at least two supporting elements (21, 22). A groove (33) is provided in the keybed (10). The groove (33) in the keybed (10) is provided parallel to an imaginary connecting line (23) between the two supporting elements (21, 22) and perpendicularly to the keys (12). The groove (33) is arranged on the underside (31) of the keybed (10). A threaded rod (41) is positioned in the groove (33). The keybed (10) can be prestressed by means of the nuts (37, 38) which are arranged in the keybed (10) and surround the threaded rod (41).

20 Claims, 3 Drawing Sheets

(56) References Cited

U.S. PATENT DOCUMENTS

Figure 1:
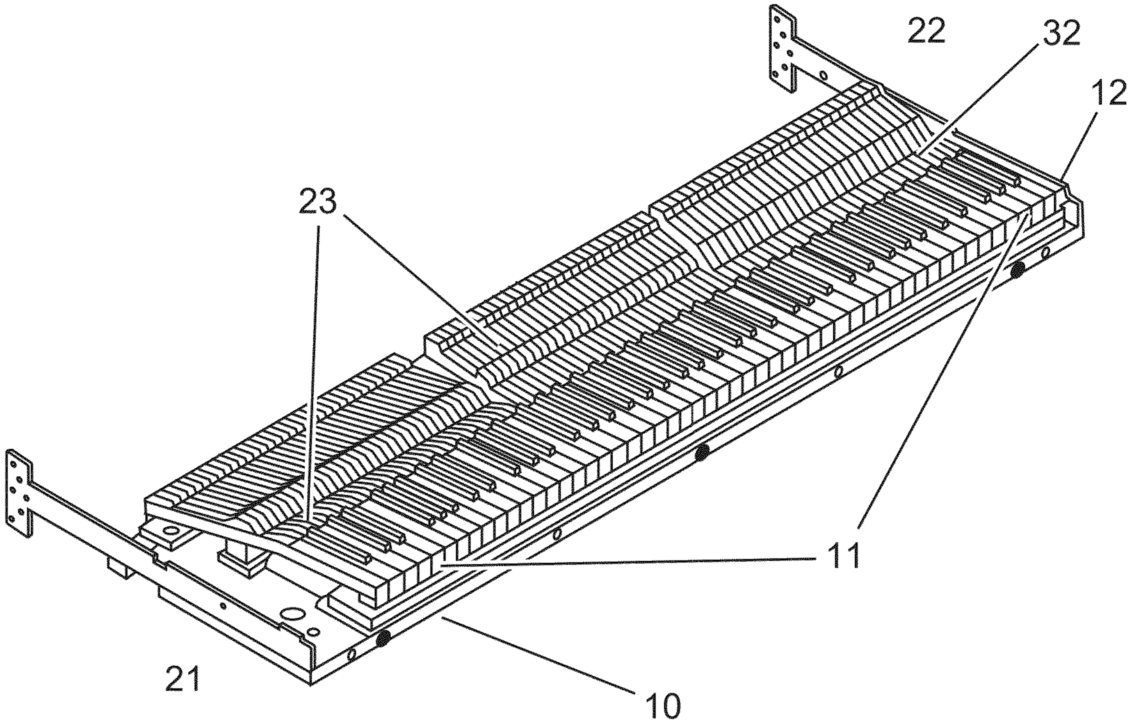

| | | | | |
|---|---|---|---|---|
| 7,750,222 | B2 * | 7/2010 | Osuga | G10C 3/12<br>84/719 |
| 7,999,162 | B2 * | 8/2011 | Izutani | G10C 3/12<br>84/439 |

OTHER PUBLICATIONS

WIPO, International Report on Patentability, PCT/EP2021/074832, Issued Apr. 13, 2023.

* cited by examiner

KEYBOARD INSTRUMENT, IN PARTICULAR A PIANO

The invention relates to a keyboard instrument, in particular a piano, having a keyboard with a multiplicity of keys and at least two supporting elements for supporting the keyboard and having a panel-formed keybed made of a wood material, which forms a console and therefore a rest for the keyboard and is borne by the at least two supporting elements.

A keyboard instrument of this kind is known, for example, from the published patent specification U.S. Pat. No. 2,191,443 A.

Keyboard instruments, in particular pianos, continue to enjoy substantial popularity and are widely used.

An essential element of most keyboards of this kind is a console, on which a keyboard having a multiplicity of keys is arranged, the operation of which by way of a mechanism therefor leads to striking of the strings of the keyboard instrument and, depending on the selected key, produces a specific tone.

In most cases, for playing on the console, the user of the keyboard instrument, that is, the piano player, operates the keys of the keyboard in a sitting position in front of the keyboard instrument. The keyboard must therefore be arranged at an appropriate height in front of the piano player. To this end, there are at least two supporting elements and, in addition, a keybed, which bears the keyboard or serves as a rest for the keyboard. The keybed is borne by the two supporting elements.

This construction has been used in this form for hundreds of years and, in practice, has changed little during this time. In many cases, during manufacture, the keybed and the keyboard arranged on it are each produced as a separate element. Each separate element is then fitted into the frame or the structure of the piano.

In order to create this separate element, the keybed is laid beneath the keyboard with the keys. In earlier times, the keybed was made of wood. For many decades, the wood material has been replaced by blockboard, most recently by particleboard. Particleboard is relatively low in cost and can be processed very well. Particleboard is also not very demanding and a keybed made of particleboard also fulfills most of the tasks imposed on the keybed.

For producing the separate element consisting of the keybed and the keyboard that is arranged on it, the particleboard is initially cut to the appropriate size and then three parallel underlays are attached, which lie level on the keybed and extend perpendicularly to the keys of the keyboard. A front strip serves to catch the keys after they strike. A rear strip serves to store the keys in the resting state and to support them. A middle strip serves to keep the balance. When one of the keys is then pressed after this element is produced, it tilts forward around the middle strip and lifts up in back off the rear strip.

After the installation of this element composed of the keybed, the three strips, and the keyboard into the piano, said element lies in the frame in such a way that, after a key has been pressed, it then strikes one of the strings in back, either directly or else indirectly via intermediate elements.

The weight of the element composed of the keybed and the keyboard arranged on it is quite substantial. The panel-formed and lengthwise extending keybed is fastened inside the frame of the keyboard. The fastening is made through the two outermost ends of the keybed at the left and right of the keyboard placed on it.

It should be noted here that keybeds have a span width on the order of 1,500.00 mm in order to be able to bridge the distance between the supporting elements to the left and right of the piano player and, at the same time, to allow the piano player the appropriate leg room that is required and also desired by him or her.

For a span width of approximately 1,500.00 mm that has to be bridged horizontally by the particleboard, blockboard, or laminboard, a force of gravity that absolutely needs to be taken into consideration acts, quite regardless of the additional forces that act on the keybed via the keys and the keyboard during the piano playing. The force of gravity acts perpendicularly downwards on the particleboard, blockboard, or laminboard. The force of gravity already leads to a certain deformation of the material of the particleboard, blockboard, or laminboard.

This deformation is on the order of approximately 2 mm or possibly even up to 4 mm. The magnitude of this deformation depends on the time of year in which the piano was manufactured. This depends, in turn, on the higher humidity and the greater fluctuations of temperature in spring and autumn in comparison to summer and winter and leads to the deformation being somewhat greater in spring and autumn and somewhat smaller in summer and winter.

Such deformation is known. It must be compensated for in order that the keys are aligned in parallel and in one plane with respect to one another. This compensation leads to substantially greater work, because it is repeatedly necessary to use different compensatory materials, which, moreover, must also have a different thickness at different positions in the keybeds.

After the compensatory elements have been put in place and and the keyboards have afterwards been attached and appropriate tests have demonstrated that everything is truly level, all structures are fastened in place and tightened and remain so permanently.

For this compensation, very well trained piano makers are required and spend a relatively long time in this operation. This has been the case for a long time and is regarded as unavoidable and absolutely essential, because a compensation of any unevenness must result.

Without a compensation of the weather-related deformation of the keybed during the manufacture, the keyboard will not work precisely and as desired, because the keys are then oriented at an angle with respect on one another—even if only slightly—and, of course, this not only introduces a visual consequence, but also acoustic consequences when the piano is played. The individual keys do not strike the strings precisely where desired and the players, in particular musically demanding players, are confronted with a keyboard that is not completely level.

It needs to be taken into consideration that piano players place quite appreciable demands on their pianos and the precision of the pressed keys and the behavior thereof has a substantial influence on the tone that is actually produced.

It would be desirable for further possibilities to exist in order to achieve level keyboards and thereby even to avoid the necessity of tedious labor to rework distorted, warped keybeds.

This object is achieved by means of the invention for a keyboard instrument of the generic kind in that a groove is provided in the keybed, in that the groove in the keybed is provided parallel to an imaginary connecting line between the two supporting elements and perpendicularly to the keys, in that the groove is arranged on the underside of the keybed, and in that a threaded rod is positioned in the groove and prestresses the keybed by means of nuts that are arranged in the keybed and surround the threaded rod.

The invention therefore works not by reshaping, for instance, the particleboard, blockboard, or laminboard in a different, perhaps less work-demanding manner to produce a level keyboard after it has been distorted and warped, but rather it departs totally from this concept and uses for this purpose an entirely new concept and a new element in the keybed and accordingly in the console of the piano.

This new element or this newly introduced inventive idea consists in the fact that, by means of a threaded rod and two nuts, the keybed is prestressed over its full length During the manufacture of the piano or during the step of producing the keybed with the keyboard arranged on it, such a prestressing makes it possible to adjust or to compensate for an existing sagging of the keybed, as described in the introduction, in an extremely precise manner and thus to adjust or to compensate for the bending behavior of the entire panel-formed structure forming the keybed in a simple manner at the point in time of manufacture.

Owing to the fact that the groove is arranged on the underside of the keybed, that is, on the side that faces away from the keyboard, it is possible to make this adjustment without any problem, even after the keyboard has been put in place. This has the advantage that the keyboard then already behaves as it would react with the keybed in the installed state. A groove that is open downwards seems unfamiliar only at first glance. The threaded rod that is positioned in this downward directed groove is held in any case, however, by the two nuts and, once they are inserted, there is no danger of the threaded rod dropping out downward. Accordingly, the prestressing occurs in a secured state.

The speed of constructing such a console with a keybed and a keyboard is substantially increased in comparison to a conventional assembly. The threaded rod needs to be tightened precisely only one time by use of the nuts and, accordingly, the keybed is prestressed, instead of the hitherto numerous, successively occurring tedious procedures, in which small paper discs or other elements are applied slowly as compensatory elements in order to test in each instance whether the compensation has or has not been achieved. In accordance with the invention, it is now possible here simply to tighten the threaded rod one time using the nuts in a way that is indicated visually by a measuring instrument, a spirit level, or another instrument and the work is then finished. To this end, such an intensive training as in the case of the previous measures is also no longer necessary, so that experienced technical personnel can devote themselves to more challenging work. The arrangement of the groove on the underside of the keybed and, in this way, the positioning of the threaded rod beneath the topside of the keybed in each instance still has further advantages.

Thus, in modern pianos, electronic aids, sensors, and the like are often arranged in the keybeds, or the keybed is used to transmit electronic signals of sensors to electronic analysis devices, such as, for example, for the measurement of sonority or of the key striking forces for educating or training pianists, or also for the recording of musical pieces that are played on the piano in question.

All of these sensors and other aids are located, however, on or just below the topside of the keybed. Owing to the arrangement of the threaded rod in a groove beneath the keybed, any interference with these sensitive electronic components is completely averted.

It is especially preferred when the groove has an arc shape.

If the groove is designed with a different depth, as viewed from the underside of the keybed, then further advantages ensue.

Thus, it is also possible, in particular, to furnish the threaded rod with a bend and, namely, to do so in such a way that, in the installed state, the threaded rod assumes its uppermost position at the two end points, whereas the lowest point lies exactly in the middle between the two end points. If the threaded rod is now appropriately tightened, it stretches and thereby exerts pressure upwards against the bottom of the groove, whereby this bottom, strictly regarded, is the cover of the groove and forms the uppermost or lowest-lying point of the groove.

It has further been found that a special choice of material for the keyboard also harmonizes especially well with the invention.

This other material is plywood. Plywood has not been hitherto used in the manufacture of keybeds for musical instruments.

Plywood consists of an uneven number of veneer sheets, which are glue-laminated together crosswise. For a use of plywood in accordance with the invention, prefinished glue-laminated plywood is used in order to achieve a manufacture that saves as much time as possible.

Plywood as material has the great advantage that it exhibits a very good tensile strength as well as compressive strength. Moreover, a high elasticity is manifested. All these properties are advantageous for the use of plywood as keybeds, whereas these advantages can hardly be exploited at all in conventional concepts.

It is optimal when, after assembly, the veneer layers of a sheet of plywood have an angle of 90° with respect to one another and when, moreover, different fiber directions each have different expansion coefficients for the keybed.

This groove extends in the longitudinal direction of the keybed over the region that is later provided for the seating area of the piano player.

Located in the keybed to the left and right of this region of the piano player are preferably two drilled holes, which extend deeper than the groove, as well as, in addition, a step Placed in each of the drilled holes is a counterpiece of a worktop connector.

On one of the two sides of the drilled hole, a sheet metal is clamped by means of two nuts in front of and in back of the worktop connector arranged there. Thus, depending on the embodiment of the invention, it is also possible to place more than two nuts on the threaded rod. Lock nuts are also possible in this case.

The concept of the keybed according to the present invention can be employed for a large number of different keyboard instruments. It is also especially advantageous that the possibility of retightening also takes into account the fact that keyboard instruments are built in countries with very different climatic conditions, even in countries in which, in the course of the year, quite different climatic conditions prevail in production facilities. Owing to the adjustability by way of the threaded rod between the two nuts, it is possible to compensate for a broad span of possible deformations of the keybed.

A further advantage lies in the fact that, by means of the concept according to the invention, it is possible to respond to the different swelling and shrinking behavior of various woods and wood materials due to differences in temperature and humidity.

A further advantage lies in the fact that the elastic formability of the keybed has the additional effect that it is possible to influence the vibrational behavior of the keybed to a certain extent. This has the consequence that the structure-borne sound that arises when the keyboard instrument is played and the keyboard is actuated is, in particular, also absorbed by the keybed and thereby affords the piano player a special playing sensation.

Tests have already shown that, after the applied prestressing and the assembly of the piano, the keybed no longer sags and remains exactly as structured as it should be. Moreover, the tightened thread also results in an effect that arises unexpectedly and surprises the experts. If the keys of the keyboard are pressed, then the vibrations are transmitted, as usual, via the strings into the bridge and the soundboard Of course, the vibrations also spread out in the opposite direction. In a construction according to the invention, these vibrations do not reach just the keybed, but also pass from the keybed all the way into the keyboard. The threaded rod ensures the prestressing of the keybed, and the keybed can thereby be excited to vibrate and these vibrations can be transmitted all the way into the keyboard.

The consequence thereof is that the player, in particular a demanding player, notices subjectively what he or she is just then playing. The piano gives the player more or less a feedback of his or her own manner of playing and thereby acts livelier. To this end, it is not necessary to install any technological or feedback element, which would disturb the player, but rather the player feels in the fingers, which rest on the keys of the keyboard during playing, that the piano is working and how it is working.

The keys and the keybed hitherto caused no sensation whatsoever or rather a muting, hollow sensation in the pianist. Now, however, the pianist feels in his or her fingers the kind of music he or she is just then playing and how it is being played. Very musical persons can also use this response of the piano to their playing to achieve something new.

As a result of the invention, pianists are unexpectedly given the impression of a piano that is working together with them.

In a preferred embodiment of the invention, it is further provided that the threaded rod is made of stainless steel. Because the threaded rod remains visible from the side of the user and since pianos have a very long lifetime, this choice of material is to be preferred visually. A use of other metallic elements is technically conceivable. However, under close scrutiny, any attack of rust would actually lead to a reduction in the desired effect over the long term.

Further preferred features are specified in the dependent claims as well as in the presented description of the figures that follows.

Figure 1A:
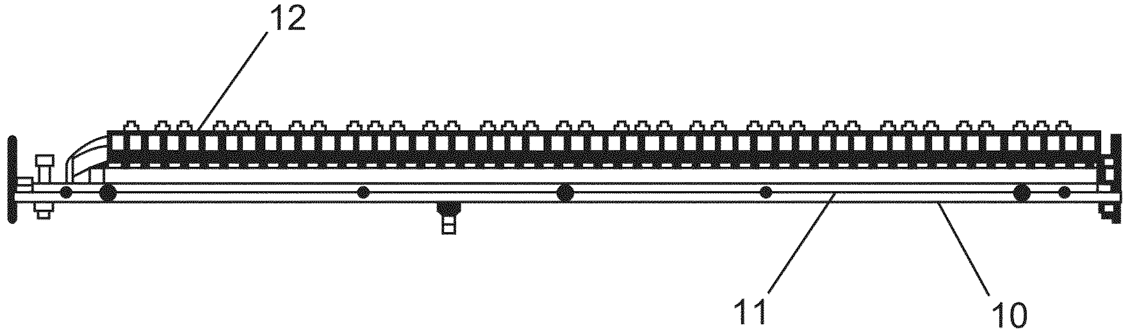
Figure 1B:
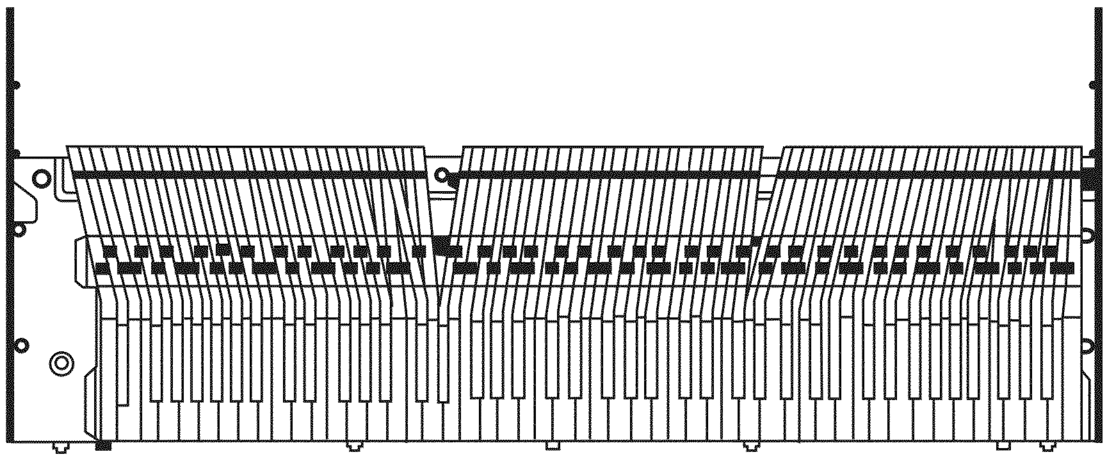

The invention and several exemplary embodiments are described in detail below on the basis of drawing. Herein:

FIG. 1 shows a schematic perspective illustration of an embodiment of a keyboard instrument according to the invention with the essential structural elements of the invention;

FIG. 1*a* shows a view from the front of the embodiment of FIG. 1;

FIG. 1*b* shows a view from the top onto the embodiment in FIG. 1 and FIG. 1*a;*

Figure 2:
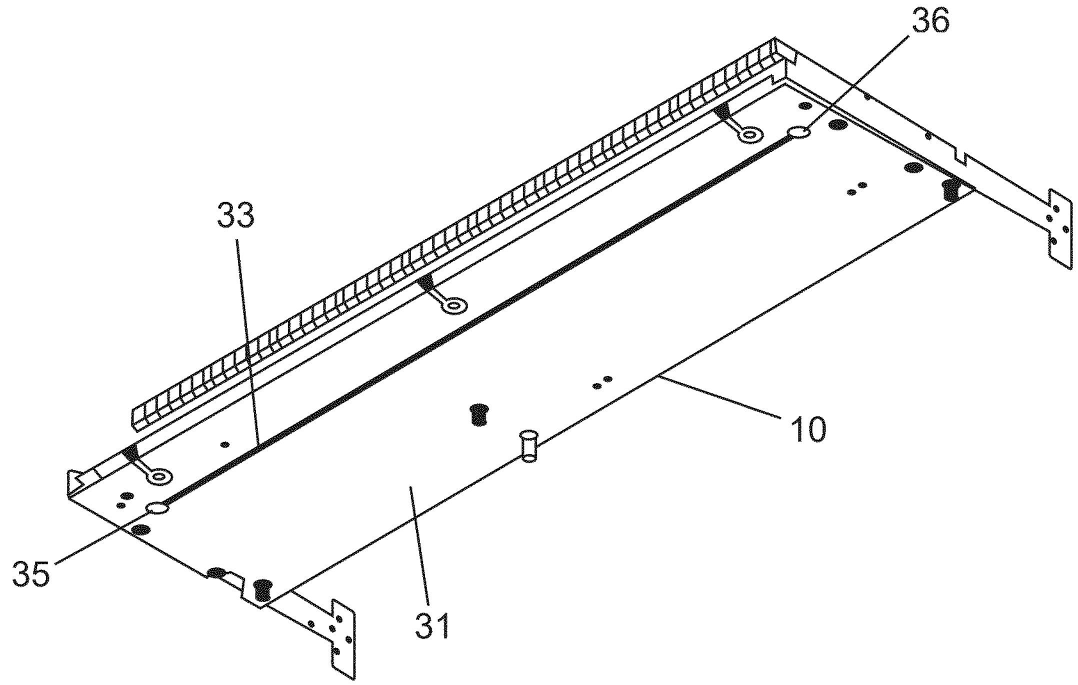
Figure 2A:
Figure 2B:
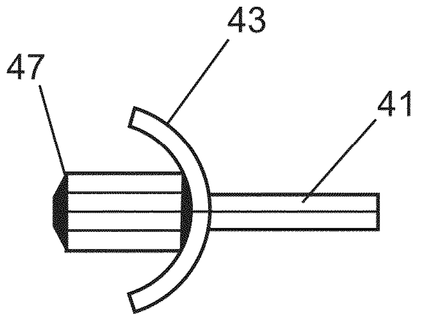

FIG. 2 shows an enlarged perspective illustration of a keybed for a keyboard instrument in accordance with FIG. 1, as viewed obliquely from below;

FIG. 2*a* shows an enlarged illustration of an element of the keybed corresponding to FIG. 2;

FIG. 2*b* shows an enlarged excerpt from FIG. 2*a*; and

Figure 2C:
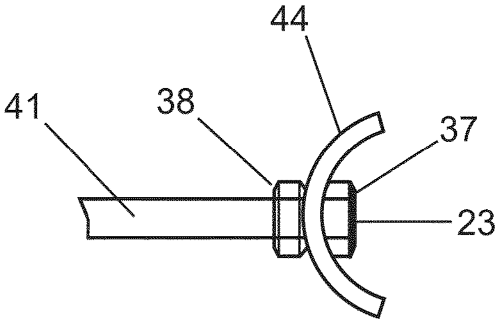

FIG. 2*c* shows an enlarged excerpt from FIG. 2*a*.

Seen in FIG. 1 is a schematic view onto a keyboard instrument, in particular a piano. The illustration is limited to those structural elements of the keyboard instrument that have special importance in connection with the present invention.

The view seen is that of a piano player onto the keyboard instrument. Seen here is essentially a keyboard 11 having a multiplicity of keys 12. The keyboard 11 rests on a keybed 10, which extends horizontally through the schematic perspective illustration in FIG. 1 and forms a rest surface that is as level as possible. In practical use, the keyboard 11 on the keybed 10 is furnished with a series of further elements. Not depicted in FIG. 1 is also the playing mechanism, by means of which the pressing of the keys 12 of the keyboard 11 is transmitted to a hammer element, which strikes the strings (not depicted) of the keyboard instrument.

The keybed 10 is supported at the left and right in the figure by left and right supporting elements 21 and 22, respectively, which are not depicted. As indicated in FIG. 1, the supporting element 21 and the supporting element 22 each have a fastening element.

In a seated position, the piano player takes his or her place on a piano stool (not depicted) in front of the keyboard 11 and positions his or her legs and feet below the keybed 10 and between the supporting elements 21 and 22 in a space that is kept free for the legs.

The supporting elements 21 and 22 are connected to each other through an imaginary line 23. The imaginary line 23 extends perpendicularly to the keys 12 of the keyboard 11 and lies in the plane that is spanned by the panel-formed keybed 10.

This means that, when pressing the keys 12 of the keyboard 11, the piano player exerts a downward force perpendicularly on the keybed 10. A further force perpendicularly downward is exerted by the force of gravity, which is exerted by the weight of the keyboard 11 on the keybed 10 and brings about a tendency of the latter to sag downwards between the two supporting elements 21 and 22.

Seen in FIG. 1*a* is a view from the front onto the embodiment of FIG. 1.

In the overall concept, the keybed 10 forms a console, which bears the keyboard 11 with the keys 12 and is played on by the piano player.

The keybed 10 is formed from a plurality of plywood sheets, which lie flat one on top of the other and which are glue-laminated together crosswise. The fiber directions of these plywood sheets or veneer layers have an angle of 90° or as close to 90° as possible with respect to one another. The different fiber directions each have, insofar as possible, different expansion coefficients.

FIG. 1*b* shows the embodiment in a view from the top.

Depicted in FIG. 2 is a schematic perspective enlarged view from the top, shown obliquely from below, onto an excerpt from the keyboard instrument of FIG. 1 with a keybed 10 and its plywood layers.

In this case, a groove 33 is seen, which is positioned in the underside 31 of the keybed 10 from the left side to the right side of the keybed 10, that is, from one supporting element 21 to the other supporting element 22. The groove 33 therefore extends approximately along the imaginary line 23 between the two supporting elements 21 and 22 of FIG. 1.

At the ends of the groove 33, in the region of the supporting elements 21 and 22, respective drilled holes 35 and 36 are introduced. These drilled holes pass upwards (that is, into the sheet of the drawing). The depicted left drilled hole 35 is a through hole, while in one embodiment, the right drilled hole has a depth of 21 mm, for example.

At the same time, a step with a depth of approximately 3 mm is formed.

The groove 33 is depicted enlarged in FIG. 2*a*. Here, it is seen that, in each of the drilled holes 35 and 36, a nut 37 or 38, respectively, is introduced. These nuts 37 and 38 are held in worktop connectors 43 and 44, respectively. This means that, in each of the two drilled holes 35 and 36, a counterpiece of a worktop connector 43 or 44, respectively, is placed.

Two further enlarged schematic illustrations with the worktop connectors are shown in FIGS. 2*b* and 2*c*.

The two worktop connectors 43, 44 are connected to each other by a threaded rod 41, which is positioned in the groove 33 along its length.

The groove 33 is thereby milled to form an arc. Although the groove 33 extends in a straight line along the imaginary connecting line 23 between the two supporting elements 21 and 22, it is of different depth at different positions. The threaded rod 41 is preferably positioned slightly bent in this groove 33 and is screwed into the two nuts 37 and 38.

On the left side* in FIG. 1, above the supporting element 22, the sheet metal of the worktop connector 44 is then tensioned by use of the two nuts 37 and 38 in front of and in back of the worktop connector 44. This can be seen in FIG. 2*c*.

* sic; right side?—Translator's note

By means of the nuts 37, 38 that are locked in this way and the step 34 in the keybed 10, it is prevented that the threaded rod 41 freely turns or falls out during the prestressing operation.

An enlarged illustration of this situation is given in FIGS. 2*b* and 2*c*.

On the opposite-lying, left side of the keybed 10 above the supporting element 22 , the drilled hole 35 passes as a through hole through the entire keybed 10. In this way, the other end of the threaded rod 41** is made continuously visible, which is not depicted.

sic; supporting element 21**?—Translator's note

The end of the threaded rod 41 can additionally be furnished with a spacer nut 47 for a better regulation of the adjustability.

It becomes possible by way of this assembly situation to prestress the keybed 10 from the topside 32 by use of a combination ratchet wrench.

In one embodiment, for a set torque on the order of 7 Nm, it can be observed how a keybed 10 that sagged by 2.1 mm and was deformed is now tensioned to be completely level, so that the advantages in accordance with the invention are fully realized.

LIST OF REFERENCE CHARACTERS

10 keybed
11 keyboard
12 keys
21 left supporting element
22 right supporting element
23 imaginary line from the left supporting element to the right supporting element
31 underside of the keybed
32 topside of the keybed
33 groove
35,36 drilled hole
37, 38 nuts
41 threaded rod
43, 44 worktop connector
47 spacer nut

What is claimed is:

1. A keyboard instrument, in particular a piano,
having a keyboard (11) with a multiplicity of keys (12),
having at least two supporting elements (21, 22) for supporting the keyboard (11),
having a panel-formed keybed (10) made of a wood material, which forms a console and therefore a rest for the keyboard (11) and which is borne by the at least two supporting elements (21, 22),
is hereby characterized
in that a groove (33) is provided in the keybed (10),
in that the groove (33) in the keybed (10) is provided parallel to an imaginary connecting line (23) between the two supporting elements (21, 22) and perpendicularly to the keys (12),
in that the groove (33) is arranged on the underside (31) of the keybed (10), and
in that a threaded rod (41) is positioned in the groove (33) and, by means of nuts (37, 38) that are arranged in the keybed (10) and surround the threaded rod (41), prestresses the keybed (10).

2. The keyboard instrument according to claim 1, further characterized in that the groove (33) has an arc shape.

3. The keyboard instrument according to claim 1, further characterized in that the keybed (10) is constructed from symmetrical crosswise glue-laminated veneer sheets of the wood material.

4. The keyboard instrument according to claim 1, further characterized in that, in the region of the two supporting elements (21, 22), a respective drilled hole (35, 36) is introduced perpendicularly to the topside (32) of the keybed (10), in that the nuts (37, 38) are accommodated in worktop connectors (43, 44), and in that the worktop connectors (43, 44) can be inserted into the drilled holes (35, 36) and the threaded rod (41) extends out of the groove (33) into the two drilled holes (35, 36) and thereby passes all the way through the worktop connectors (43, 44) and is held in them by the nuts (37, 38).

5. The keyboard instrument according to claim 4, further characterized in that, in the one drilled hole (35), a spacer nut (47) is arranged for adjustability.

6. The keyboard instrument according to claim 1, further characterized in that the threaded rod (41) is made of stainless steel.

7. The keyboard instrument according to claim 2, further characterized in that the keybed (10) is constructed from symmetrical crosswise glue-laminated veneer sheets of the wood material.

8. The keyboard instrument according to claim 2, further characterized in that, in the region of the two supporting elements (21, 22), a respective drilled hole (35, 36) is introduced perpendicularly to the topside (32) of the keybed (10), in that the nuts (37, 38) are accommodated in worktop connectors (43, 44), and in that the worktop connectors (43, 44) can be inserted into the drilled holes (35, 36) and the threaded rod (41) extends out of the groove (33) into the two drilled holes (35, 36) and thereby passes all the way through the worktop connectors (43, 44) and is held in them by the nuts (37, 38).

9. The keyboard instrument according to claim 3, further characterized in that, in the region of the two supporting elements (21, 22), a respective drilled hole (35, 36) is introduced perpendicularly to the topside (32) of the keybed (10), in that the nuts (37, 38) are accommodated in worktop connectors (43, 44), and in that the worktop connectors (43, 44) can be inserted into the drilled holes (35, 36) and the threaded rod (41) extends out of the groove (33) into the two drilled holes (35, 36) and thereby passes all the way through the worktop connectors (43, 44) and is held in them by the nuts (37, 38).

10. The keyboard instrument according to claim 8, further characterized in that, in the one drilled hole (35), a spacer nut (47) is arranged for adjustability.

11. The keyboard instrument according to claim 9, further characterized in that, in the one drilled hole (35), a spacer nut (47) is arranged for adjustability.

12. The keyboard instrument according to claim 2, further characterized in that the threaded rod (41) is made of stainless steel.

13. The keyboard instrument according to claim 3, further characterized in that the threaded rod (41) is made of stainless steel.

14. The keyboard instrument according to claim 4, further characterized in that the threaded rod (41) is made of stainless steel.

15. The keyboard instrument according to claim 5, further characterized in that the threaded rod (41) is made of stainless steel.

16. The keyboard instrument according to claim 7, further characterized in that the threaded rod (41) is made of stainless steel.

17. The keyboard instrument according to claim 8, further characterized in that the threaded rod (41) is made of stainless steel.

18. The keyboard instrument according to claim 9, further characterized in that the threaded rod (41) is made of stainless steel.

19. The keyboard instrument according to claim 10, further characterized in that the threaded rod (41) is made of stainless steel.

20. The keyboard instrument according to claim 11, further characterized in that the threaded rod (41) is made of stainless steel.

* * * * *